Oct. 20, 1964     H. C. OBER     3,153,435

SHREDDER AND CHOPPER

Filed Nov. 21, 1963     2 Sheets-Sheet 1

INVENTOR.
Howard C. Ober,
BY John H. Leonard,
his ATTORNEY.

Oct. 20, 1964  H. C. OBER  3,153,435
SHREDDER AND CHOPPER
Filed Nov. 21, 1963  2 Sheets-Sheet 2

INVENTOR.
Howard C. Ober,
BY John H. Leonard,
his ATTORNEY.

3,153,435
SHREDDER AND CHOPPER
Howard C. Ober, 1180 Croydon Road, Cleveland, Ohio
Filed Nov. 21, 1963, Ser. No. 325,289
5 Claims. (Cl. 146—123)

This invention relates to shredders and particularly to a power driven, readily transportable shredder for use in yard work for shredding dry leaves, grass trimmings, sticks, twigs, and the like which are readily frangible due to their dry condition, and also for shredding fresh greenwood, such as freshly cut vines, weeds, shrubbery trimmings, and the like, which are flexible and wiry.

Shredders for yard use are well known in the art. In general, such a shredder comprises a hopper having an opening into which the material to be shredded is fed and in which is a power driven rotary cutter. The cutter is operable at relatively high speed for directly chopping the material into fragments. Concurrently it causes the material to migrate, during cutting by the cutter, along an apertured wall of the hopper extending peripherally of the cutter close to the outer extremities of the cutting blades thereof. This migration of the material along the wall also contributes to its fragmentation.

Shredders of this type are quite effective for fragmenting material such as leaves, grass, twigs and the like, particularly when the material is quite dry. However, they are not effective for fragmenting fresh cut greenwood trimmings, such as hedge and shrub trimmings, vines, weed stalks or whips, coarse grass, and the like which are insufficiently brittle to be frangible. Instead, if these green materials are fed into the hopper in the conventional manner, either alone or along with dried leaves and the like, they tend to catch on parts of the equipment and the rotary cutter, and twist and wind about the cutter, generally tightening around the bearings and shaft of the cutter and otherwise binding the cutter and preventing its proper rotation. Seldom are they cut up or fragmented and discharged with the other material.

The present shredder is designed to handle materials ranging from very dry brittle material, such as dried leaves, grass, sticks and small twigs, and the like, and also the flexible and wiry green woods, such as freshly cut tough weeds, vines, hedge trimmings, and whips from shrubbery and from the limbs of trees.

Furthermore, the shredder is so arranged that the two types of material can be ground concurrently with assurance that the green wood will be well chopped up and fragmented so that it can mix with the dry leaves and other materials and be discharged through the peripheral wall of the hopper.

Further objects and advantages will become apparent from the following description wherein reference is made to the drawings, in which—

Figure 1:
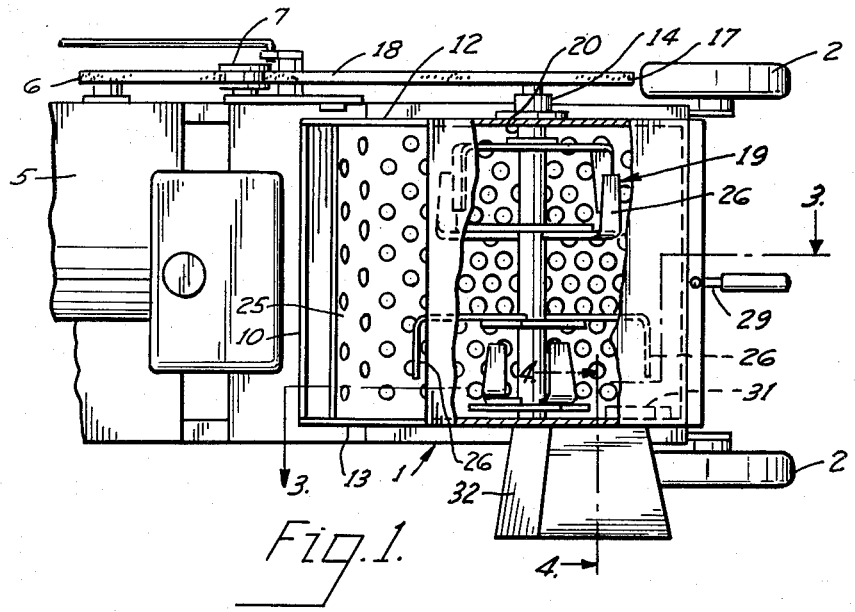
FIG. 1 is a fragmentary top plan view of a shredder employing the principles of the present invention, the main filling spout being omitted for clearness in illustration.

Referring to the drawings, the invention is shown embodied in a shredder comprising, in general, a frame 1 supported at the front end by suitable wheels 2 and at the rear end by wheels 3, and provided with handle bars 4 for propelling and guiding the frame.

A conventional internal gasoline engine 5 is mounted on the frame and has a driving pulley 6 which is drivingly connected to the engine through the medium of a manually operable clutch 7.

The fragmenting and pulverizing unit of the shredder comprises a hopper 10 which preferably is open at the top to provide a main feed opening. A filling spout 11 is carried in the hopper and facilitates the feeding of the material to be shredded through the main feed opening.

Figure 2:
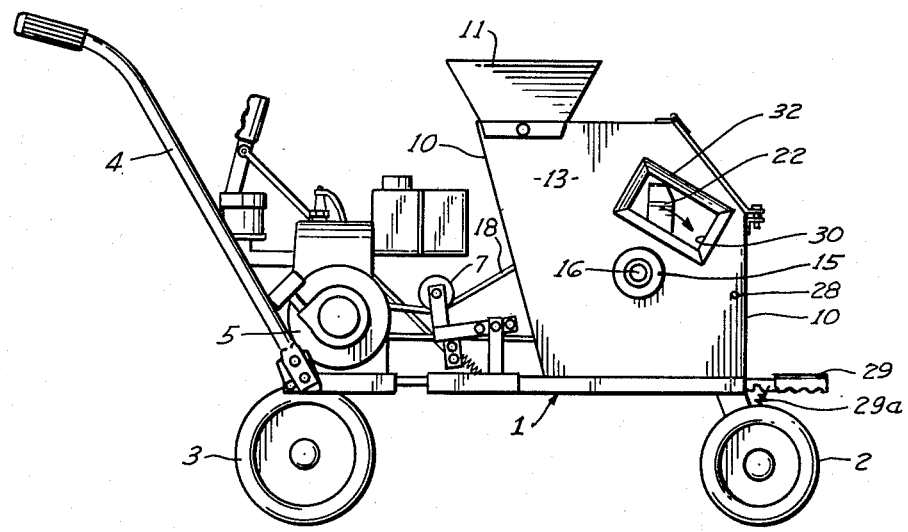
FIG. 2 is a front elevation of the apparatus illustrated in FIG. 1.

The hopper 10 has sidewalls 12 and 13 which support suitable bearings 14 and 15 which, in turn, rotatably support a rotatable shaft 16. The shaft 16 is driven by a pulley 17 which is connected by a belt 18 to the pulley 6. The shaft 16 is generally horizontally arranged and is driven in a clockwise direction in FIG. 2. Mounted on the shaft 16 for rotation therewith is a rotary cutter, indicated generally at 19. The cutter comprises a rotary sleeve 20 on which are fixedly mounted a plurality of pairs of blades supporting flanges 21, the pairs of flanges being arranged laterally in spaced relation to each other in a row extending endwise of the shaft 16 and sleeve 20.

In the form illustrated, each pair of flanges supports two diametrically opposite blades 22 which are detachably secured thereto by bolts and the like.

The hopper has a forward wall portion 23, a curvilinear, upwardly concave, bottom wall portion 24, and a rear wall portion 25. These portions form essentially a peripheral wall coaxial with shaft 16, and spaced a short distance outwardly from the outer radial limit of the rotary path defined by the outer ends of the blades 22, so that the blades 22 pass in close proximity to the peripheral wall during rotation.

Preferably an outer end portion 26 of each blade 22 is bent over so as to extend endwise of the axis of rotation, and so that substantially each portion of the peripheral wall, in a direction endwise of the axis, is swept by portions 26 of one or more of the blades 22. Thus the wall portions 23 and 24 provide the discharge and fragmenting wall of the hopper.

Figure 3:
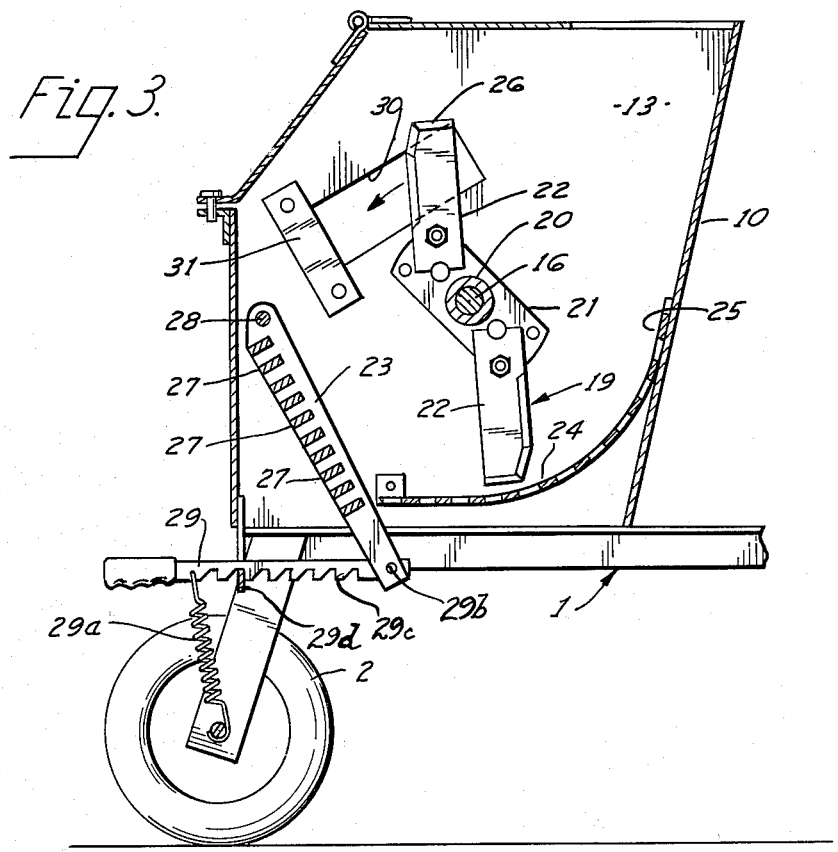
FIG. 3 is an enlarged vertical fragmentary longitudinal sectional view of the shredder and is taken on the line 3—3 in FIG. 1.
Figure 4:
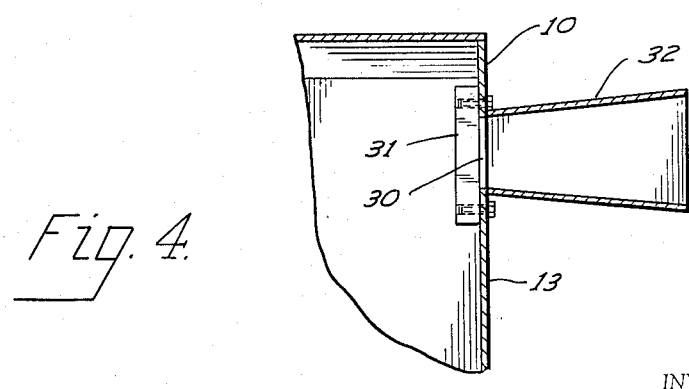
FIG. 4 is a fragmentary vertical cross sectional view and is taken on the line 4—4 in FIG. 1.

The wall portion 23 thereof preferably is in the form of a number of elongated, rigid bars 27 of rectangular cross section arranged with their widths horizontally and extending lengthwise of the axis, the full width of the hopper to provide a grill. This wall portion 23 may be made as a separate unit and hingedly connected to the hopper by suitable coaxial pivots 28 extending transversely of the hopper. The wall portion 23 may be swung forwardly from its normal operating position, as shown in FIG. 3, wherein it forms part of the peripheral wall, to an open or dumping position wherein access to the interior of the hopper at the bottom is afforded.

For holding the wall portion 23 in its normal position, a lever 29 is pivoted at its rear end to the lower end of the portion 23 by a pivot 29b. A tension spring 29a is connected to the lever at the opposite side of the pivot and to the front axle or other part of the hopper and is operative to bias the forward portion of the lever downwardly. The lever has teeth 29c that engage a suitable lug 29d on the hopper for latching the portion 23 in normal position. This arrangement facilitates manual movement of the wall portion 23 to an open position by operation of the lever in case of overload and packing of material in the hopper so that the excess material can be removed. This latching arrangement, however, is not a critical part of the present invention.

The portion 24 on the peripheral wall is perforated with a multiplicity of apertures uniformly distributed over its entire extent so that material can readily discharge therethrough as it is reduced to proper size.

The leading edges of the outer ends 22 of the blades, and if desired, of the radially extending portions, may be sharpened to provide effective cutting edges for cutting the material in the hopper during rotation of the cutter blades. This action, plus the impelling of the material transversely of the bars 27 and along the wall portion 24 and the edges of the apertures therein causes effective fragmentation of the material.

However, as mentioned, it is very difficult to fragment and shred freshly cut, flexible green wood, such as weeds, vines, hedge trimmings and whips from shrubbery, trees and the like by such blades and walls, and for this purpose additional means are provided with a supplemental feed opening through which the latter type of materials are fed into the hopper. In the form illustrated, the side wall 13 of the hopper is provided with a supplemental feed opening 30.

Mounted within the hopper, preferably on the wall 13, adjacent to the supplemental feed opening 30, is a stationary cutter means cooperable with the cutting edge on the rotary cutter blade or blades adjacent to the wall 13. As the materials are fed endwise through the passage 30, the end portions thereof which protrude within the hopper extend into the path of the cutting edges of the adjacent blades and are cut off by coaction of these cutting edges and the cutter means progressively as the materials enter through the opening 30. By regulating the rate of feed of the materials through the opening 30, the length of the portions cut off at each passage of a blade can be readily predetermined. These lengths fall immediately into the hopper and mix with other materials in the hopper and are further fragmented. The fragments are discharged with the fragments of the other material through the peripheral wall of the hopper.

In the form illustrated, the opening 30 is elongated in the direction of rotation of the blades. The cutter means is a single cutter block and is mounted at the end of the opening 30 which is trailing in the direction of rotation of the blades. The cooperable cutter means may be the forward radial cutting edge, or edges, of the blade, or blades, of the rotary cutter which are carried on the flange 21 next adjacent the sidewall 13.

These blades are positioned so that their cutting edges pass very closely to the innermost surface or cutting edge of the block 31 so that any material entering the opening 30 is cut off against the block by the blades progressively as the material is fed through the supplemental openings.

In the form shown for purposes of illustration, the cutter is rotatable about a horizontal axis and the material is fed into the hopper through the main feed opening radially and is discharged radially, whereas the material fed through the opening 30 is fed transversely of its direction of discharge and into the path of the blades. Thus, during the fragmentation of dried leaves, dead grass, sticks and the like, or independently thereof, green wood and like material may be fed through the supplemental passage 30 and chopped off in short lengths progressively as it is fed therethrough, these short lengths immediately being mixed with the other material in the hopper and fragmented and discharged.

Having thus described my invention, I claim:

1. A shredder comprising a hopper having a main feed opening for receiving material to be shredded, a rotary cutter in said hopper for shredding the material, power means to drive the cutter, said hopper having discharge openings therein through which the shredded material is discharged continuously during the shredding operation said hopper having a supplemental feed opening through which material can be fed into the hopper, and supplemental cutter means in the hopper adjacent said supplemental opening and cooperable with the rotary cutter to cut off material progressively as it enters the hopper through said supplemental opening.

2. A shredder according to claim 1 wherein the hopper has a perforate wall spaced from, and extending peripherally of the cutter path, and a side wall extending transversely of the axis of rotation, said rotary cutter includes a rotor and generally radially extending blades thereon distributed endwise of the axis of rotation and having outer end portions disposed to travel in closely spaced relation to the perforate wall during rotation of the rotor, said supplemental feed opening is in said side wall and is spaced radially outwardly from the axis and radially inwardly from the perforate wall, the supplemental cutter means including at least one cutter block in the hopper having a cutting edge adjacent said opening, and at least one of the blades of the cutter nearest the side wall having a cutting edge which passes in cutting relation to the cutting edge of the block during rotation of the cutter.

3. A shredder according to claim 2 wherein the supplemental feed opening is elongated and extends endwise in the general direction of rotation, alongside the path of said one blade, and said cutting edge is at that end of the supplemental opening which is relatively trailing in the direction of rotation of said one blade past the opening.

4. A shredder comprising a hopper with a main feed opening therein, a rotary cutter therein, power means to drive the cutter, said hopper having a perforate wall extending peripherally of the path of rotation of the cutter and through which shredded material discharges in one direction relative to said axis of rotation, said hopper having another wall angularly disposed relative to peripheral wall and having a supplemental feed opening through which material may be fed transversely of said direction into the path of the cutter, stationary cutter means in the hopper adjacent said supplemental opening, and said cutter having a cutting portion cooperable with said cutter means to cut off progressively lengths of material as the material enters the hopper and through the supplemental opening.

5. A shredder comprising a hopper having a feed opening, through which loose material can be fed into the hopper, and a perforate wall, a rotor mounted in the hopper, power means to drive the rotor, cutting blades on and extending outwardly of the rotor and having outer end portions movable along and in closely spaced relation to said perforate wall for shredding the loose material fed into the hopper, and operative to impel the material along said perforate wall circumferentially of the axis of rotation of the rotor during shredding, said hopper having a second wall angularly disposed to said perforate wall, said second wall having a supplemental feed opening therein, stationary cutter means in the hopper adjacent said supplemental opening of the second wall, cooperating cutter means on the rotor cooperating with the stationary cutter means for progressively cutting off material entering the hopper through said supplemental opening during its initial entry therethrough.

No references cited.